United States Patent [19]

Moorehead

[11] Patent Number: 4,590,462
[45] Date of Patent: May 20, 1986

[54] OIL LEAKAGE DETECTION APPARATUS

[75] Inventor: Robert M. Moorehead, Richardson, Tex.

[73] Assignees: Glen C. Amon; Horace T. Ardinger, Jr., both of Dallas, Tex.

[21] Appl. No.: 695,681

[22] Filed: Jan. 28, 1985

[51] Int. Cl.$^4$ ............................................. G08B 21/00
[52] U.S. Cl. ..................................... 340/605; 340/619; 340/815.31; 250/227; 116/284; 73/61.1 R
[58] Field of Search ............ 340/603, 604, 605, 815.31, 340/618, 619, 632; 73/61.1 R; 116/311, 312, 313, 206, 284; 250/227

[56] References Cited

U.S. PATENT DOCUMENTS

| | | | |
|---|---|---|---|
| 4,058,802 | 11/1977 | Meyers | 73/61.1 R X |
| 4,159,420 | 6/1979 | Tsunoda | 340/605 X |
| 4,351,642 | 9/1982 | Bonavent | 340/605 X |

*Primary Examiner*—Glen R. Swann, III
*Assistant Examiner*—Jeffery A. Hofsass

[57] ABSTRACT

A chemically activated rotary actuator mechanism is described which reacts to exposure to hydrocarbons such as gasoline and oil to cause a rotor to forcibly rotate from a rest or static position. Spring members load the rotor with compressive forces which act through the rotational axis of the rotor to cause the mechanism to be inherently unstable in the static position. The rotor is rotatably mounted in a body member and constrained from rotation with respect to the body member by means of shear pins which degrade when exposed to hydrocarbons. Rotation of the rotor shaft is utilized in generating an alarm.

13 Claims, 10 Drawing Figures

OIL LEAKAGE DETECTION APPARATUS

This invention relates generally to alarm and sensing devices, and more particularly, to chemically activated alarm and sensing devices.

More specifically, the present invention is drawn to devices which react to environmental presense of hydrocarbons and find special utility in the positive sensing and positive reaction to exposure to hydrocarbons, such as oil, to cause an alarm to be generated and thus function as oil leak detectors for use in oil storage and distribution systems.

With the advent of fiber optic technology, fiber optic loops have been employed for the detection of oil leakage in pipeline and storage applications. These techniques employ detection of light passed through the loop from a suitable light source. Increased attenuation in the loop in the presence of oil in the loop is detected and caused to generate an alarm. The utility and effective response time of such detection devices may not always provide a responsive alarm, especially when the devices are employed in hostile environments both above and below ground.

An object of the present invention is to provide a chemically activated rotary actuator mechanism for use in conjunction with optical fiber loop detection technologies to respond to exposure to hydrocarbons such as oil to inflict a severe attenuation condition in such fiber loops.

A further object of the present invention is the provision of a rotary actuator mechanism for imparting severe attenuation in associated optical fiber loops by employment of severe microbending and/or severence techniques.

A still further object of the present invention is the provision of a reliable and positive acting rotary actuator mechanism which is uniquely immune and stable in hostile enviroments in the absense of hydrocarbons in that environment.

The present invention is featured in the provision of a spring loaded rotary actuator mechanism which is normally constrained from rotation by shear pin means formed of a hydrocarbon degradable material sufficiently strong to constrain rotor rotation under exposure to environments lacking hydrocarbon content, and readily degradable when exposed to hydrocarbons to fail in shear and effect a powerful rotation of the associated rotor.

A further feature of the invention is the provision of a rotary actuator mechanism employing respective diametrically-oppose opposing compression loading forces on a rotor constrained from rotation by hydrocarbon degradeable shear pin means, whereby a basically unstable mechanism is realized when the shear pin means in intact, and the normal shear load on the pin means is essentially zero.

A still further feature of the present invention is the provision of a normally reliably-stabalized rotary actuator mechanism which responds to exposure to hydrocarbons to become highly and positively unstable.

These and other objects and features of the present invention will become apparent from reading the following description with reference to the accompanying drawings in which:

FIG. 1 represents a general functional diagram of proposed alarm usage of the chemically activated rotary actuator of the present invention;

FIG. 2, a functional diagram of the rotary actuator as employed with a fiber optic detector and alarm system;

FIGS. 3A, 3B, and 3C, functional loading force diagrams of a single rotary actuator mechanism;

FIGS. 4 and 5, loading force diagrams of plural rotary actuator embodiments in accordance with the present invention;

FIG. 6, a top view of a single rotary actuator mechanism;

FIG. 7, a front elevation view, partially sectioned, of the embodiment of FIG. 6; and FIG. 8, a partially sectioned view at section 8—8 of FIG. 6.

GENERAL DESCRIPTION OF THE INVENTION

The present invention resides basically in a rotary actuator device which comprises a rotor member including a rotor shaft which is mounted for rotation with respect to a body member. The rotor is constrained from rotation with respect to the body member by means of shear pin means which is composed of material which is structurally degradeable when exposed to hydrocarbons such as, for example, oil and gasoline. The rotor is loaded with considerable equal and diametrically opposed forces with the shear pin means intact, such that in the static condition, essentially zero force is imposed on the rotor shaft and the shear force on the shear pin means is essentially zero. This is accomplished by a pair of compression springs with respective pivotably mounted spring ends, each spring having one end pivotably mounted to the rotor at a point radially outward on a diameter of the rotor shaft and the other end pivotably mounted at a point lying on an axis coincident with that diameter. In this manner the springs store considerable potential energy while the rotor shaft has essentially zero force applied thereto, with the shear pin means having essentially shear loading imposed.

Thus, in the static condition, the shear pin means need only bear minimal, if not zero, loading to constrain the rotor in a fixed position in the mechanism. Since the system, however, is inherently an unstable structure, the considerable potential energy in the spring loading members is unleashed into considerable kinetic energy should the structural integrity of the shear pin means be degraded. Now, the spring imparted forces on the rotor create a moment arm which loads the shear pins to cause them to fail in shear, where upon the potential energy stored in the springs imparts a considerable torque to cause the rotor to turn in a powerful, rapid twisting motion. This rotation may then be utilized in activating an alarm system.

DETAILED DESCRIPTION OF THE INVENTION

The invention will now be described as it may be employed in various configurations for detecting oil leaks in a pipeline system, utilizing single and multiple rotary actuator mechanisms, which, when triggered may actuate an alarm.

Figure 1:
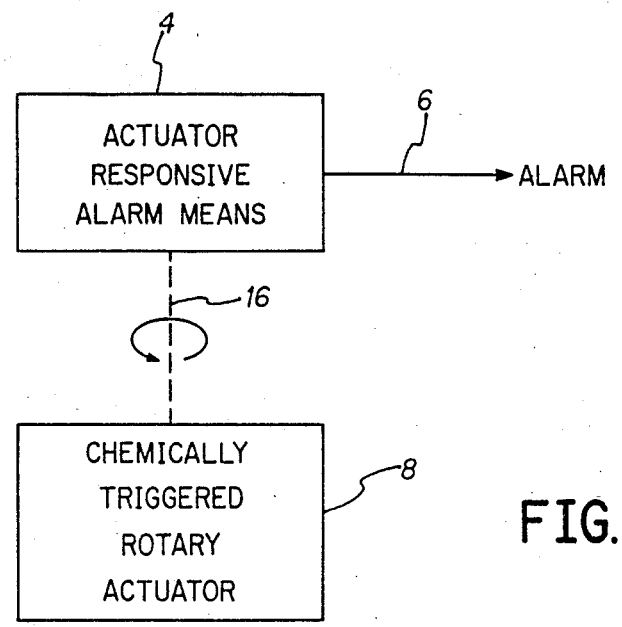

With reference to FIG. 1, a chemically triggered rotary actuator 8 is functionally depicted as having a mechanically rotable shaft 16, rotation of which drives an atuator responsive alarm means 4 to generate an alarm output 6. In accordance with the present invention, rotation of the shaft 16 occurs when the rotary actuator is exposed to a hydrocarbon environment such as oil. The rotation of shaft 16 causes the alarm means 4 to generate a suitable alarm. Because of its unique tolerance to hostile environments, the alarm means to be described herein comprises an optical fiber transmitting light from a light source to a light detector, and shaft 16 communicates with the optical fiber in such a manner that shaft rotation effects extreme microbending of the fiber, with the resulting attenuation being detected to cause an alarm to be generated. It is contemplated, however, that alarm means 4 of FIG. 1 may comprise other shaft rotation responsive means, such as, for example, a switching means to open or close a signal transmitting path to cause an alarm to be generated.

Figure 2:
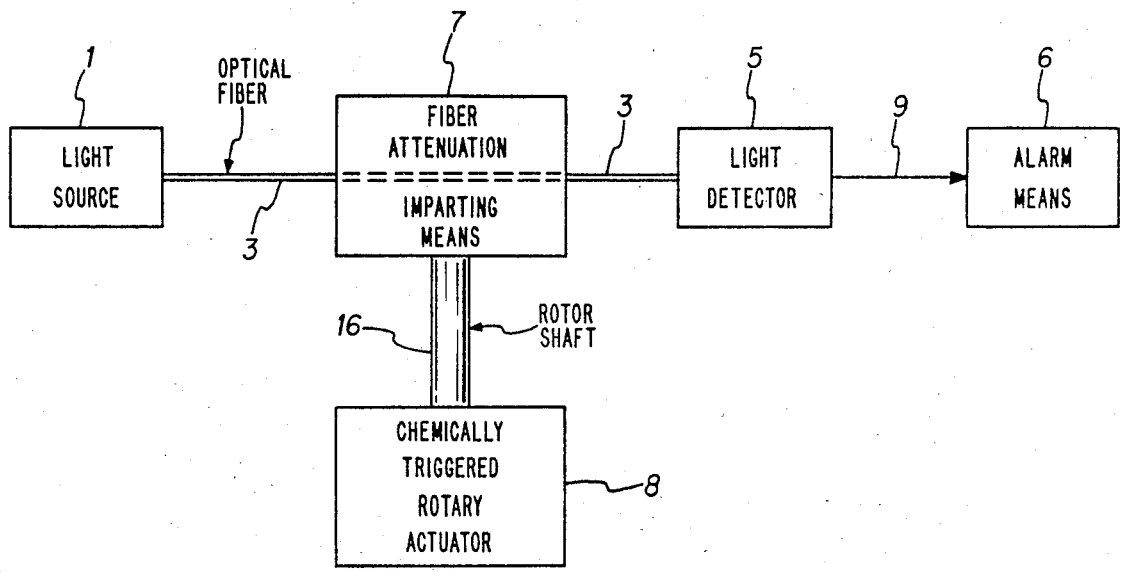

FIG. 2 shows alarm means 4 of FIG. 1 embodied as a fiber optic alarm system, comprising a light source 1 from which light is passed through optical fiber 3 to a light detector 5 the output 9 of which drives an alarm means 6. Optical fiber 3 is functionally depicted as communicating with a fiber attenuation imparting means 7. Rotation of rotary actuator 8 output shaft 16 from a predefined static rest position causes attenuation imparting means 7 to inflict severe attenuation in communicating optical fiber 3 as by extreme microbending or actual breakage.

Figure 3A:
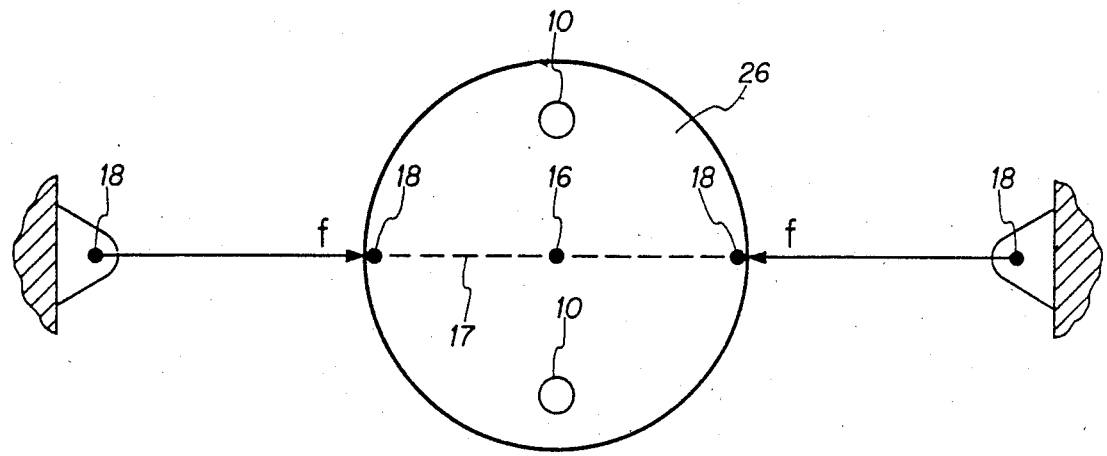
Figure 3B:
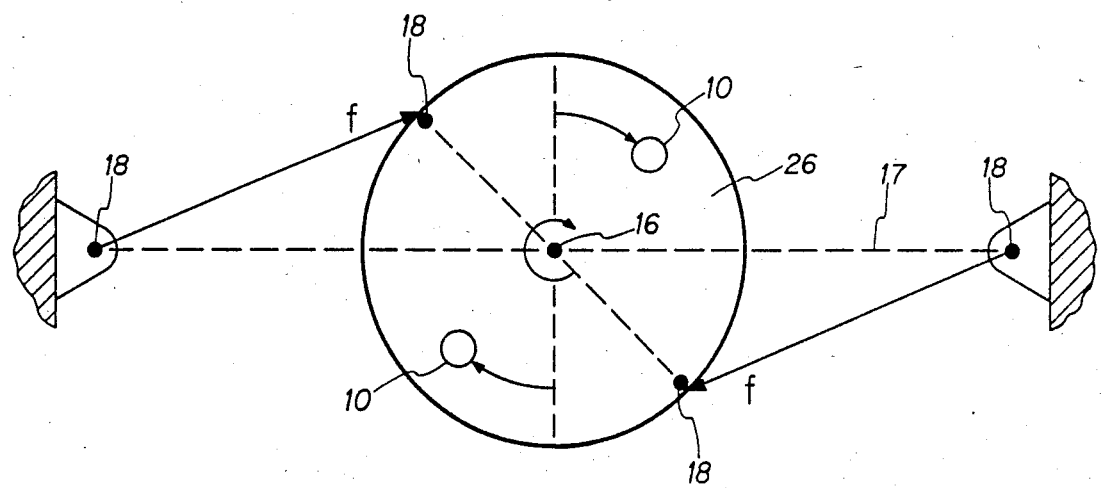
Figure 3C:
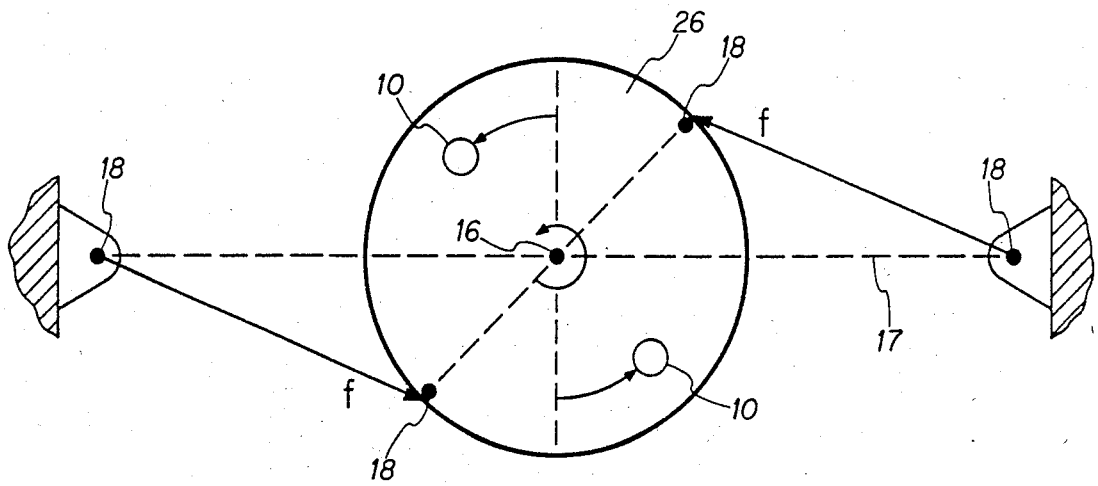
Figure 4:
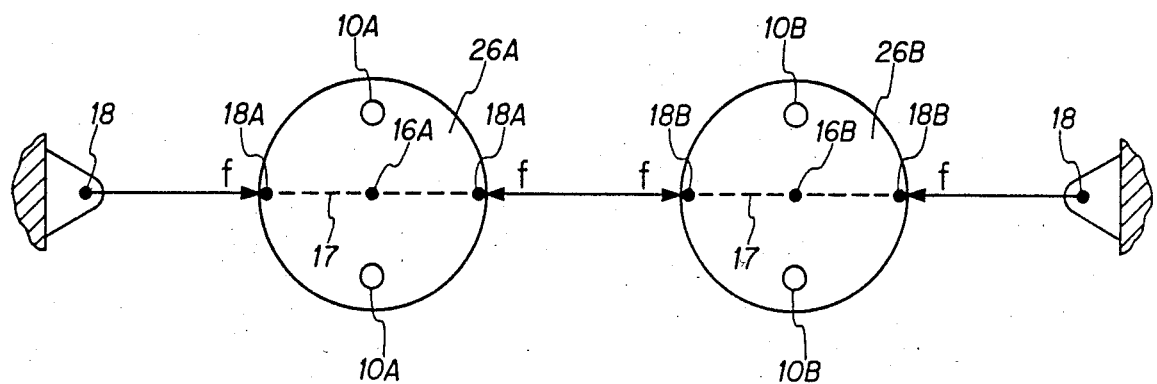
Figure 5:
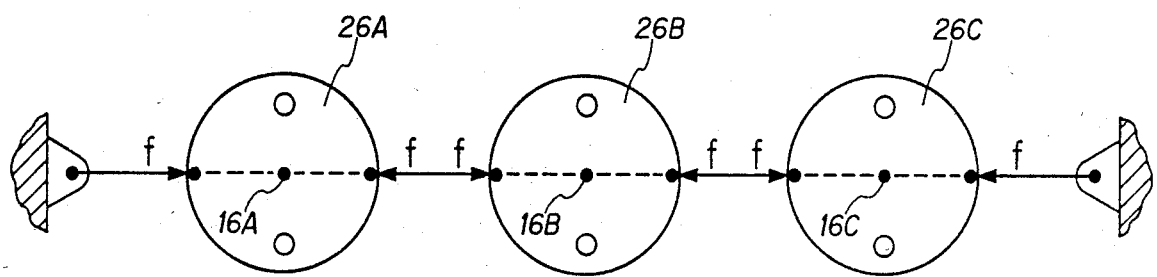

The mechanics of a detailed embodiment of the rotary actuator of the invention may best first be comprehended by reference to the static and dynamic forces diagramatically depicted in FIGS. 3–5.

FIG. 3A illustrates static loading on an embodiment employing a single rotor in a rotary actuator in accordance with the present invention. A generally cylindrical rotor member 26 is illustrated as comprising a rotor shaft 16 which is rotable mounted with respect to a body or frame member (not shown). Forces f are imposed at diametrically opposed points along a diameter 17 of the rotor 26. The forces f, as will be further described, may be imposed by respective compression springs, each spring having its respective ends pivotally supported with respect to a body member which houses rotor 26 and with respect to rotor pivot points 18 lying on the axis 17 of rotor 26. Since forces f are equal, the net loading on the shaft 16 of rotor 26 is seen to be essentially zero. First and second shear pin members 10 are functionally depicted in FIG. 3A, which, as will be further described, communicate with the rotor mounting body so as to constrain the rotor from rotation in the static position shown. It is to be noted that in this static position, there is essentially zero shear load imposed on the hydrocarbon-degradable shear pins 10 and the pins 10 need not possess any appreciable strength, even though an extremely high potential energy may be stored in the compression springs which impose forces f against rotor 26.

FIGS. 3B and 3C functionally depict the rotation of rotor 26 upon exposure of shear pins 10 to a hydrocarbon, such as oil. Since the structure is inherently unstable, oil dissolves the shear pins to initiate failure in shear as the high potential energy stored in the spring members causes the rotor 26 to forcibly rotate in one direction or the other, with the forces f operating on moment arms to severely torque the rotor shaft. As will be further described, rotation of rotor shaft 16 from its static or rest position may be utilized to, for example, inflict severe microbending on an optical fiber with which the rotor shaft 16 communicates.

FIG. 4 functionally depicts two rotors 26A and 26B embodied in the mechanism. Here three compression spring members are utilized with a central spring imposing forces f at spring pivot points 18A and 18B on rotors 26A and 26B respectively, while the outer depicted forces f are each imposed by a spring member with one end pivotably mounted to the mechanism body and the other end pivotably mounted to a communicating rotor member.

FIG. 5 functionally depicts three rotors 26A, 26B, and 26C to further illustrate how the basic single rotor member embodiment of FIG. 3A may be expanded. In FIG. 5, four compression spring members are employed, with outer depicted forces f imposed by a spring member with one end pvotably mounted to the mechanism body and the other end pivotably mounted to a communicating rotor member. Intermediate depicted forces f are imposed by spring members pivotably mounted to rotor pairs 26A-26B and 26B-26C, respectively.

It is to be understood that the basic principle of the actuator mechanism may be embodied with a single spring member which develops a single compressive force passing through the rotational axis of the rotor member, in which case the net force acting on the rotor shaft under static conditions is not zero as in the preferred embodiments described herein, and, upon shear pin failure, an initial frictionally imparted force exists which must be overcome by the shear moments developed upon rotor rotation from the static position.

In the single rotor embodiment shown in FIG. 3A, an associated optical fiber alarm system would include an optical fiber communicating with rotor shaft 16, while in the two-rotor embodiment of FIG. 4 the optical fiber would communicate with each of shafts 16A and 16B. In the three-rotor embodiment depicted in FIG. 5, the optical fiber would communicate with each of rotor shafts 16A, 16B and 16C.

Figure 6:
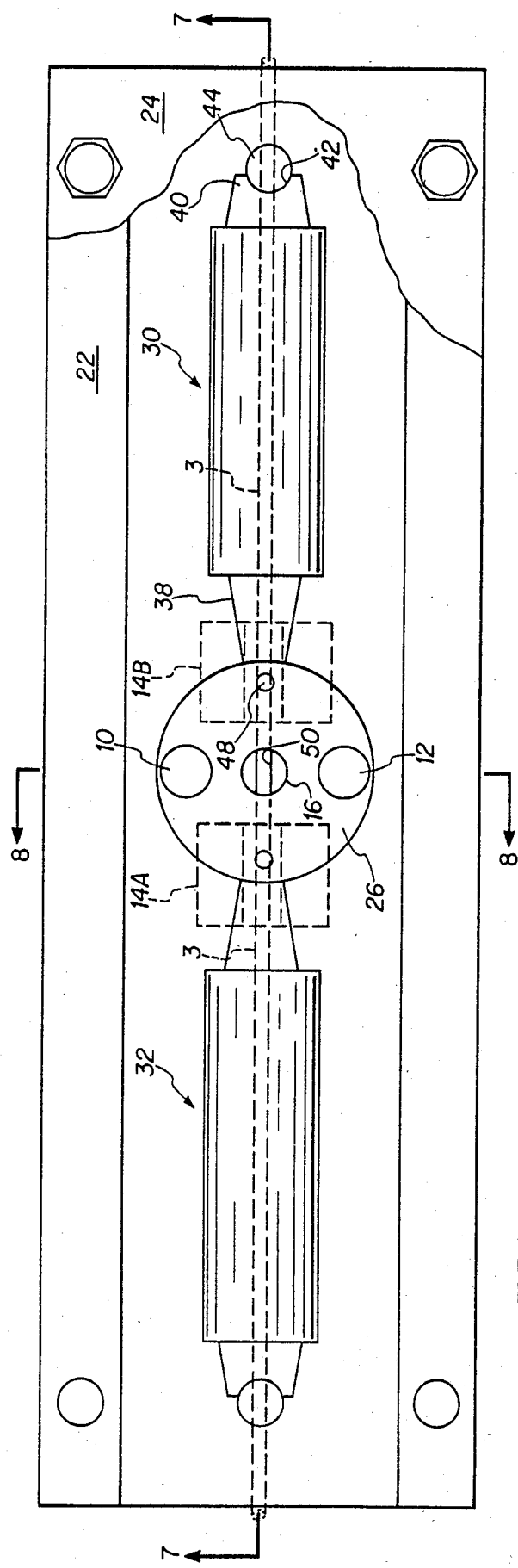
Figure 7:
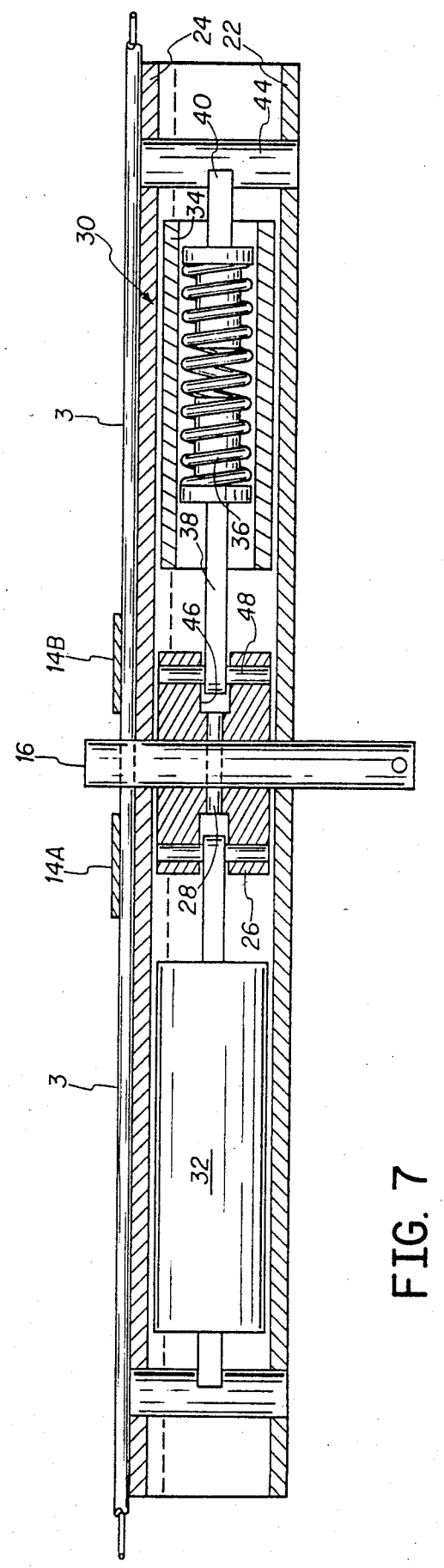
Figure 8:
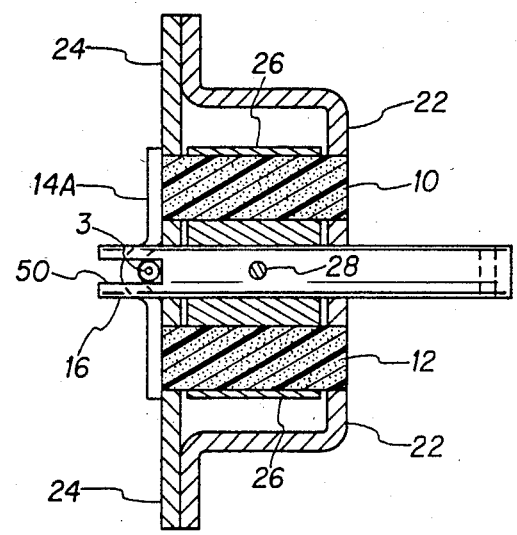

A single-rotor embodiment of the rotary actuator mechanism is illustrated in FIGS. 6, 7 and 8. The aforementioned body member is best shown in FIG. 8 which shows section 8-8 of the top view of FIG. 6. A top plate member 24 is affixed to a cover plate 22 which provides bottom and side walls of the body member. The body member houses a rotor 26 with a rotor shaft 16 passed through rotor 26 and secured by a pin member 28. Rotor shaft 16 is rotatably received in respective plain bearing through-holes in top body plate member 24 and bottom cover plate 22.

With particular reference to FIG. 8, the rotor body 26 is provided with diametrically-opposed through-holes whose axes are parallel to that of rotor shaft 16. The through-holes in rotor member 26 are disposed radially outward from the rotation axis of rotor shaft 16. Top cover plate 22 and bottom plate 24 are formed with through-holes which align with those in the rotor 26. Shear pin members 10 and 12 are inserted through the body member and rotor through-holes such that the respective shear pin end-extremes extend through the body member, thereby contraining the rotor 26 from rotation with respect to the body member.

With reference to the top view of FIG. 6 and front view of FIG. 7, rotor 26 is shown in communication with a pair of compression spring assemblies 30 and 32. Each of spring assemblies 30 and 31 comprises a housing within which a compression spring is contained. As shown in FIG. 7 for typical spring assembly 30, a cylindrical housing 34 surrounds a compression spring 36. The ends of spring 36 are affixed to respective pivot arms 38 and 40. Pivot arm 40 is formed with a concave groove or notch 42. Notch 42 addresses a pivot post 44, the latter best shown in FIG. 7 as being fixed to the top plate 24 and bottom cover 22 which comprises the mechanism body member.

The other pivot arm 38 of spring assembly 30 is pivotbly mounted to rotor 26. As seen in FIGS. 6 and 7, pivot arm 38 extends into a circumferentially extending slot 46 formed in rotor 26 and pivotably mounted to rotor 26 by means of pivot pin 48 received in rotor 26 passed through pivot arm 38 at a position radially outward from the rotation axis of rotor shaft 16. With spring assembly 30 in place, the spring 36 loads rotor 26 with a compressive force which acts through the rotational axis of rotor shaft 16 to provide the previously described force f.

Similiarly the spring assembly 32 on the left-depicted side of FIG. 7 communicates with the body member and rotor so as to have each spring end pivotably mounted with respect to the mechanism body member and rotor 26, and when assembled with spring compressed, loads rotor 26 with an equal compressive force which acts through the rotational axis of rotor shaft 16 to provide an opposing force f acting through the rotational axis of rotor shaft 16. With the spring assemblies 30 and 32 equally loaded, the net force on the shaft 16 of rotor 26 is zero. As previously described, under such a static loaded condition with shear pins 10 and 12 intact, the shear loading on the pins 10 and 12 is zero.

In operation, as aforedescribed, the substantially zero shear force exerted on the shear pins 10 and 12 provides distinct utilitarian advantages, since the shear pin material is not loaded with compressive forces which might otherwise inhibit the hydrocarbon-degradability of the shear pins, and essentially zero shear loading of the shear pins precludes creep of the pin material which might otherwise introduce undesirable unbalance of the rotary actuator mechanism in the absence of exposure to hydrocarbons. Further, the inherent substantially-zero loading on the rotor shaft under static conditions, minimizes frictional retarding force development which otherwise might deter trigger action of the mechanism.

FIGS. 6, 7 and 8 show the rotary actuator mechanism of the present invention as it may communicate with an optical fiber cable alarm system. Referring to FIG. 8, the shaft 16 of rotor 26 is formed with a diametrically extending slot 50 within which an optical fiber cable 3 is received. Slot 50 may be formed with sharp edges. Optical fiber cable 3, as best shown in FIGS. 6 and 8, may be clamped to the assembly body plate 24 on either side of rotor shaft 16 by means of respective guide plates 14A and 14B. Upon rotation of the rotary actuator in response to loss of structural integrity of the rotor shear pins 10 and 12 caused by exposure to hydrocarbons, optical cable 3 is forceably bent if not broken to introduce appreciable attenuation in cable 3, detection of which may cause an alarm to be generated.

Although the present invention has been described with respect to particular embodiments thereof, it is not to be so-limited, as changes might be made therein which fall within the scope of the invention as defined in the appended claims.

I claim:

1. A rotary actuator mechanism comprising a cylindrical rotor member, a body member, means for rotatable mounting said rotor member with respect to said body member, means applying respective compressive forces at diametrically opposite radially disposed points on said rotor member whereby the net force acting on the rotational axis of said rotor is essentially zero, shear pin means passing through said rotor parallel to the rotational axis of said rotor and radially disposed with respect to the rotational axis of said rotor, said shear pin means having end extremes extending from said rotor means and received in said body member to constrain rotation of said rotor with respect to said body member, said shear pin means comprising a substance soluable in hydrocarbons.

2. A rotary actuator mechanism as defined in claim 1, wherein said means for applying respective compressive forces comprises first and second compression springs each having one end pivotably mounted to said body member at a point lying on an extension of a diameter of said rotor member and the other end pivotably mounted at a radially disposed point on said rotor lying on said rotor diameter.

3. A rotary actuator mechanism as defined in claim 1, wherein said shear pin means comprises at least one pin member passing through said rotor member.

4. A rotary actuator mechanism as defined in claim 3 wherein said shear pin means comprises first and second pin members passed through said rotor member at respective radially opposite points, with said radially opposite points lying on a rotor diameter perpendicular to the rotor diameter defining the radially disposed opposite points to which said compressive forces are applied.

5. An alarm system for detecting presence of hydrocarbon substance comprising a rotary actuator mechanism including a rotatable shaft, said shaft having a longitudinally extending slot formed in the end extreme thereof, a fiber optic detector means with a light generator passing light through a fiber optic cable to a light detector, said detector being responsive to attenuation in said cable to cause an alarm to be generated, said cable being received in and extending through said rotor slot, and said rotary actuator comprising means response to exposure of said actuator to hydrocarbons to effect rotation of said actuator shaft from a predefined static position.

6. The alarm system as defined in claim 5; wherein said rotary actuator mechanism comprises a cylindrical rotor member, a body member, means for rotatably mounting said rotor member with respect to said body member, means applying respective compressive forces at diametrically opposite radially disposed points on said rotor member whereby the net force acting on the rotational axis of said rotor is essenially zero, shear pin means passing through said rotor parallel to the rotational axis of said rotor and radially disposed with respect to the rotational axis of said rotor, said shear pin means having end extremes extending from said rotor and received in said body member to constrain rotation of said rotor with respect to said body member, said shear pin means comprising a substance soluable in hydrocarbons.

7. The alarm system as defined in claim 6 wherein said means for applying respective compressive forces comprises first and second compression springs each having one end pivotably mounted to said body member at a fixed point lying on an extension of a diameter of said rotor member and the other end pivotably mounted at a radially disposed point on said rotor lying on said rotor diameter.

8. The alarm system as defined in claim 6, wherein said shear pin means comprises at least one pin member passing through said rotor member.

9. The alarm system as defined in claim 8 wherein said shear pin means comprises first second pin members passed through said rotor member at respective radially opposite points, with said radially opposite points lying on a rotor diameter perpendicular to the rotor diameter defining the radially disposed opposite points to which said compressive forces are applied.

10. A rotary actuator mechanism comprising a cylindrical rotor member, a body member, means for rotatably mounting said rotor member with respect to said body member, means applying a compressive force to a radialy disposed point on said rotor member, said force acting through the rotational axis of said rotor, shear pin means passing through said rotor parallel to the rotational axis of said rotor and radially disposed with respect to the rotational axis of said rotor, said shear pin means having end extremes extending from said rotor and received in said body member to constrain rotation of said rotor with respect to said body member, said shear pin means comprising a substance soluable in hydrocarbons.

11. A rotary actuator mechanism as defined in claim 10, wherein siad means for applying said compressive force comprises a compression spring having one end pivotably mounted to said body member at a fixed point lying on an extension of a diameter of said rotor member and the other end pivotably mounted at a radially disposed point on said rotor lying on said rotor diameter.

12. A rotary actuator mechanism as defined in claim 10, wherein said shear pin means comprises at least one pin member passing through said rotor member.

13. A rotary actuator mechanism as defined in claim 12, wherein said shear pin means comprises first and second pin members passed through said rotor member at respective radially opposite points, with said radially opposite points lying on a rotor diameter perpendicular to the rotor diameter defining the radially disposed point to which said compressive force is applied.

* * * * *